July 13, 1937.  W. C. HILL  2,086,911
TREATMENT OF WHOLE CITRUS FRUIT
Filed Dec. 24, 1934  2 Sheets-Sheet 1

Inventor
Wallace Curtis Hill
By Lyon & Lyon
Attorneys

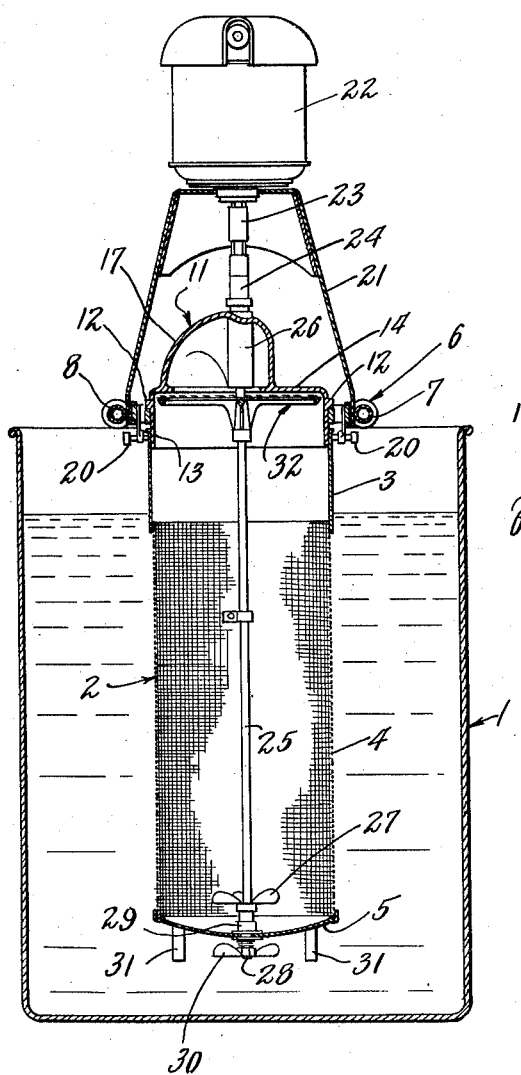
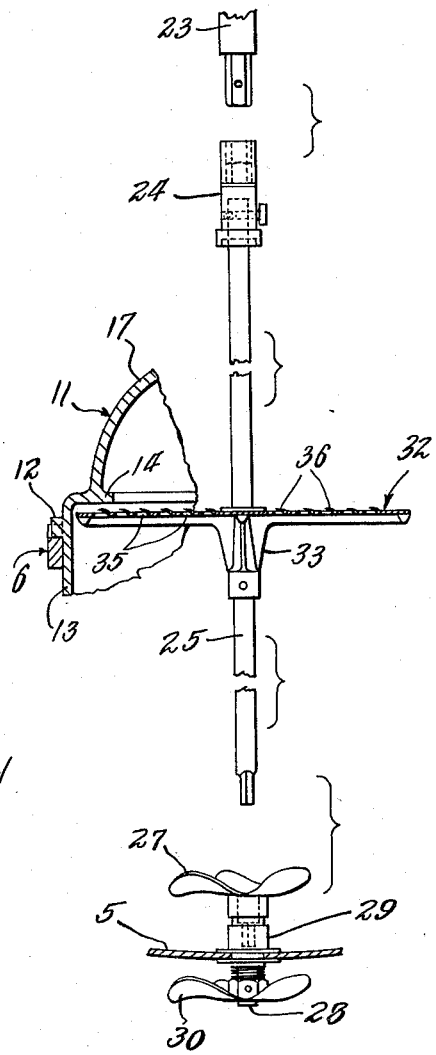

Patented July 13, 1937

2,086,911

UNITED STATES PATENT OFFICE 2,086,911

TREATMENT OF WHOLE CITRUS FRUIT

Wallace Curtis Hill, Pomona, Calif.

Application December 24, 1934, Serial No. 759,009

9 Claims. (Cl. 99—105)

This invention relates to a method and apparatus for treating citrus fruits for the production of beverage bases or citrus juice products capable of being used in the manufacture of beverages, ices, confections and other food products. The invention is particularly directed toward a method whereby substantially all juice and natural oils of a whole citrus fruit may be recovered and rendered available for use in the manner stated.

The invention is also directed toward a citrus fruit product containing the internal juices as well as oils and flavoring materials and vitamins that are present in the fresh whole fruit.

In the production of citrus juices or citrus juice beverages heretofore, it has been customary to cut the fruit in half, ream out the meat to disrupt the internal cell structure, and thus obtain the juice. The extraction of oil from the peels was accomplished separately by the use of solvents and the like. During this subsequent and separate extraction of oils from the peel, a large proportion of the volatile oils and water-soluble constituents (possibly including constituents containing vitamin C) was lost and the more delicate and volatile fractions could not be successfully collected. When attempts were made to add the extracted oil in small proportions to the previously and separately extracted juice, it was found substantially impossible to duplicate the flavor of fresh citrus juice nor to disperse the oil in sufficiently fine form within the juice. Processes of the character described hereinabove, furthermore, result in products which have a relatively low vitamin C content. This was probably due to the extensive handling and manipulation to which the juices and fruit were exposed.

Moreover, the citrus juices of the prior art were very unstable, spoiling very quickly upon exposure to air or light. The deterioration was evidenced not only by a change in color but also by the development of terebinthinate odors and flavors. Furthermore, the citrus juices of the prior art would coagulate or form what appeared to be a very weak and delicate gel. This phenomenon often occurred after the major portion of any finely divided solids present had settled to the bottom of the container in which the juice was stored. A clarified or filtered juice is not suitable because much of the characteristic flavor of citrus juice appears to lie in the thermo-labile finely divided solids. Filtration or clarification practically eliminates the characteristic color of the juices.

It is an object of this invention, therefore, to disclose and provide a method whereby citrus juices and sirups may be made from whole citrus fruit, such juices being extremely high in vitamin content and containing not only the aqueous internal juices but also the oils and flavoring substances present in the outer skin or peel of the fruit.

A further object is to disclose and provide a citrus juice or sirup which contains solids in a substantially stable form.

A further object is to disclose and provide a citrus juice or sirup containing solids and natural oils in stable dispersion within the juice.

Another object of the invention is to disclose and provide a method whereby whole citrus fruit may be treated for the production of juices and sirups containing natural oils in a state of fine and substantially stable dispersion.

A further object is to disclose and provide means whereby the hereinabove mentioned objects may be obtained in a ready, efficient and economical manner.

In describing the invention, reference will be had to the appended drawings, in which:

Fig. 2 is a vertical section of a portion of said apparatus.

Fig. 4 is an exploded view of the rotating parts of the machine illustrating their assembly.

Figures 1, 3:
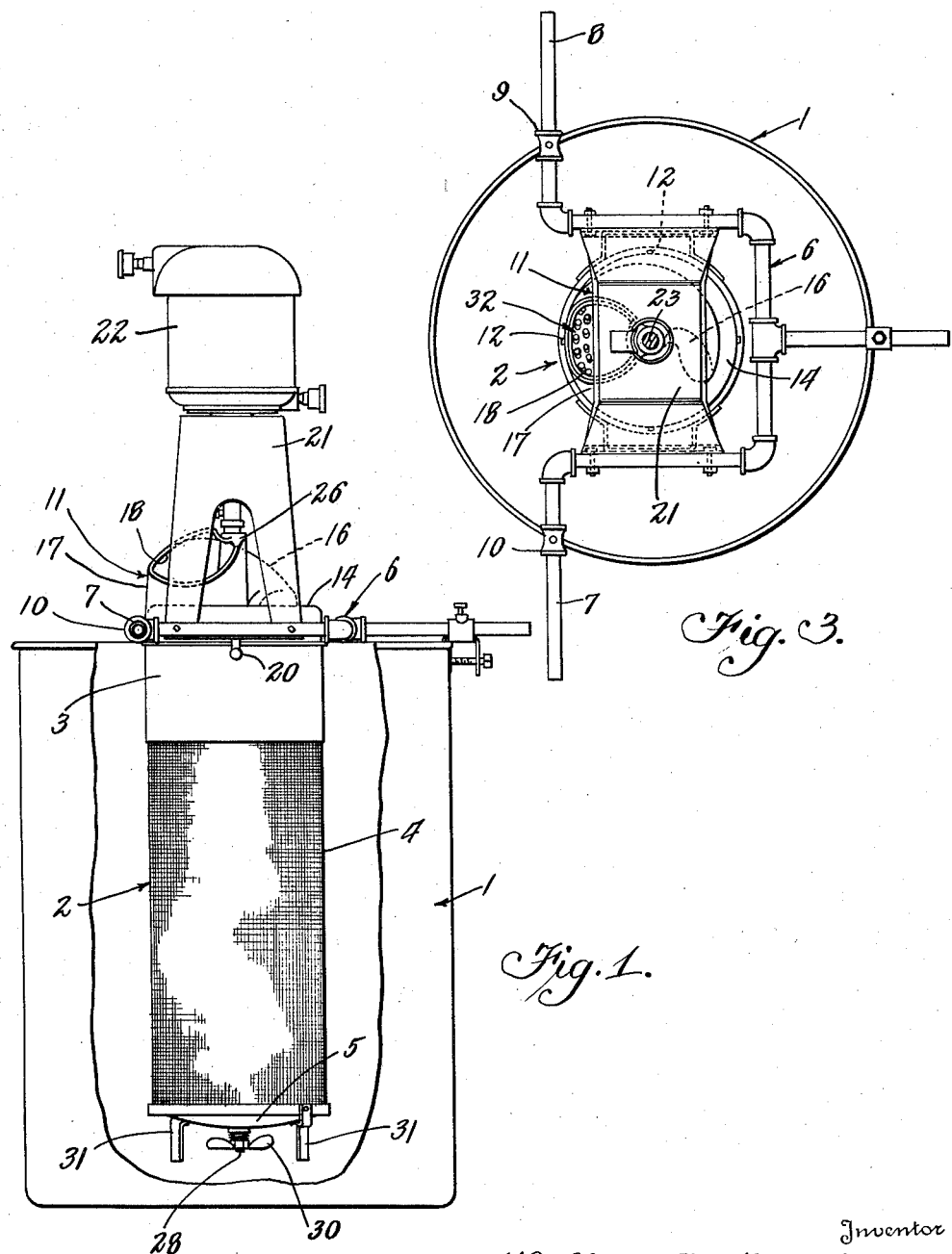
Fig. 1 is a side elevation, partly broken away, of one form of apparatus adapted for use in carrying out the method of this invention.
Fig. 3 is a plan view.

As is well known, citrus fruit are provided with an outer skin or peel containing natural oils and waxes. Some of these oils are extremely volatile and impart the characteristic flavor and odor to fresh citrus products. Beneath the outer peel or skin is a white, cellulosic, pulpy and absorbent layer of material called the albedo. The central portion of the fruit consists of juice sacs arranged within segments covered with thin fibrous membranes.

Certain bitter and unpalatable constituents are believed to be carried by the albedo and by the more fibrous and larger membranes within the fruit. The process of this invention permits a thorough extraction of the aqueous juices from the juice sacs as well as the extraction of oils from the outer peel while facilitating the removal of the fibrous membranes and albedo from the finished product.

Attempts have been made heretofore to produce a citrus product by passing whole citrus fruits through an auger or screw type of shredding machine but in such prior methods the fruit was subjected to considerable pressure which crushed the internal juice sacs and simultaneously caused the oil cells to discharge their contents into the atmosphere.

Moreover, such prior methods compressed the albedo in the presence of the liberated juice so that when the compressive force was removed, the albedo immediately absorbed a large proportion of the juice. By passing oranges through an ordinary meat grinder, for example, one obtains a slimy, plastic mass from which practically no free juice can be obtained. Upon pressing such mass through a fine screen, the bitter substances present in the albedo are extracted by the juice, rendering the final product rather milky and unpalatable.

In general, the method of this invention comprises bringing whole citrus fruit in contact with a rapidly moving shredding surface whereby the fruit is shredded in a plurality of substantially parallel planes extending transversely through the fruit. In this manner, a portion of the oil cells carried by the peel are disrupted and shredded at substantially the same time that a portion of the juice sacs of the fruit are disrupted. The simultaneous liberation of oil and juice is conducted in such manner that the oils are absorbed by and dispersed in the juice in the form of a very finely divided stable suspension. It has been discovered that the fibrous membrane and albedo, although shredded simultaneously, are not reduced to as fine state of division as the outer peel or the inner juice sacs. For this reason it is possible to separate the albedo and coarser fibrous membranes with relative ease from the finely divided solids, juice and oils dispersed therein.

In order that the resulting product be substantially stable, that is, not exhibit a separation between the oil and aqueous juice, it has been found necessary to perform the shredding operation with great rapidity. The shredding surface with which the fruit are brought into contact, for example, should move at a linear speed if not less than about 1500 feet per minute and preferably at a speed of from about 2000 to 3000 feet per minute. When the process is carried out at the preferred speeds, the oils are found to be dispersed in the form of droplets having an average diameter of about 0.0005 inch or less. Stability of the resulting product is not obtained when these droplets are larger in diameter than about 0.001 inch. When speeds lower than 1500 feet per minute are used, there is a tendency for the oil to assume the form of large droplets which separate from the product, eventually forming a film of oil on the surface. Oxidation sets in and terebinthinate odors and flavors are developed whereas these disadvantages are not encountered when the preferred and higher shredding speeds are used. Although all citrus fruits can be effectively shredded within the range of speeds indicated hereinabove, the precise speed adapted to produce most effective dispersion of the natural oils will depend somewhat upon the type of citrus fruit being treated and the size of the oil cells or oil sacs found in the peel of such fruit.

The appended drawings illustrate one form of apparatus whereby the method of this invention may be effectively carried out. As there shown, the apparatus may comprise a suitable tank 1 in which there is positioned an extraction cylinder, generally indicated at 2, said cylinder comprising an upper imperforated portion 3, a lower perforated or screen portion 4 and a base 5. The extraction cylinder 2 may be suspended from a frame 6 provided with outwardly extending supporting arms 7 and 8 which may rest on the upper edges of the tank 1. Collars 9 and 10 may be carried by the supporting arms for the purpose of being interposed between said arms and the edges of the tank.

The supporting frame 6 holds and supports a head 11 provided with outwardly extending lugs 12 adapted to cooperate with lug-receiving grooves formed in the edges of the supporting frame 6. The head is provided with a substantially cylindrical, downwardly extending body portion indicated at 13 and a transverse substantially horizontal portion 14. This portion 14 is provided with a spirally arranged opening of gradually decreasing width, indicated at 16, the transverse member 14 being built up from near the edges of said spiral opening, as indicated at 17, so as to form a spirally arranged, downwardly directed conduit of gradually decreasing area in vertical section. A feeding aperture 18 is formed in the upper end of the spiral feeding conduit thus formed.

The upper portion of the extraction cylinder 2 may be provided with an outwardly extending flange and be of such diameter as to slip over the body portion 13 of the head 11. Suitable clamps 20 carried by the supporting frame 6 permit the extraction cylinder 2 to be removably attached to the head and frame, the clamps 20 cooperating with the outwardly extending flange of the upper portion 3 of the extraction cylinder 2.

The supporting frame 6 may be provided with a suitable frame 21 adapted to support a motor 22 in position concentrically with respect to the extraction cylinder 2. The drive shaft 23 of the motor 22 may be removably coupled as by means of a slidably adjustable coupling 24 to a drive shaft 25 extending through a bearing sleeve 26 carried by the head 11 and into the extraction tank 2. The lower end of the shaft 25 may carry an agitator 27 and be removably keyed to a short length of shafting 25 journaled in the base 5. The end of the shaft 25 may be squared for introduction into a square socket portion carried in the coupling 29 forming a part of the stub shaft 28. The lower end of the stub shaft 28 below the base 5 may be provided with agitator blades 30. The base 5 may be provided with downwardly extending legs 31 adapted to protect the propeller blades 30 in the event the extraction cylinder is dropped.

Immediately below the plane of the transverse partition 14 of the head 11, the shaft 25 is provided with a shredder disc, generally indicated at 32, carried by a hub 33 attached to the shaft 25. The shredder disc 32 may in general be made of relatively thin material but in such case it should be provided with radially directed reinforcing ribs and a reinforced edge. The disc itself is suitably perforated or punched, as indicated at 35. A portion of the disc adjacent each of the perforations is raised above the plane of the disc, as indicated at 36, the edge of said raised portion being sharpened to a razor edge so as to provide shredding knives lying in a plane of about $\frac{1}{16}$ inch above the upper surface of the disc 32. The method of construction described hereinabove provides a through opening in the disc immediately in advance of the sharp edges of the knives, thereby preventing choking of the disc with the shredded portions of the fruit. It is also to be noted that sharp edges of the shredder knives are pointed in the direction of rotation of said disc and toward the narrow portion of the spiral hood or feeder 16.

In operation, the tank 1 is partially filled with milk, sirup, alcoholic solution or other medium in which it is desired to incorporate the juice and oils of citrus fruits. Preferably the level of the liquid in the tank 1 is sufficiently high to completely submerge the perforated screen cylinder 4. Citrus fruits are then introduced through the opening 18 in the head 17 while the shredding disc and agitators 27 and 30 are rotated at the desired speed. As stated hereinbefore, the linear speed of the shredders should be between 2000 and 3000 feet per minute. The citrus fruits are pressed against the shredder by the downwardly directed spiral throat 16, each fruit being shredded by a series of transverse cuts, the spherical fruit being thus reduced to semi-spherical, then to a segment of a sphere, and finally completely shredded. The oils and juices thus liberated immediately fall into the liquid within the tank 1. The agitators 27 and 30 maintain circulation of the liquid through the perforated cylinder 4, thereby causing the oils and juices to pass into the tank 1 while retaining the fibrous matter within the screen cylinder 4. It will be observed that the shredded fibrous and pulpy matter is not maintained in contact with juices but instead is immediately brought into contact with the fluid in the tank 1. A form of extraction takes place in the screen cylinder 4, extractable constituents being distributed and dissolved in the liquid whereas the fibrous solids are retained within the cylinder. The formation of an impenetrable layer of fibrous material on the inner screen surfaces is prevented by reason of the vigorous agitation afforded by the propellers 27. The screen 4 is preferably of a relatively fine mesh, say 10 to 15 mesh. These sizes have been found sufficient to permit certain of the very fine juice sacs to pass into the liquid in tank 1 and to also permit finely shredded and colored portions of the peel to pass therethrough while retaining in the screen cylinder 4 long, fibrous and pulpy portions originating in the membranes and albedo.

An orange beverage base prepared on a small unit answering the description given hereinabove was made using 100 pounds of water, 50 pounds of sugar and 2½ pounds of citric acid for the liquid in tank 1; 56 pounds of oranges were then grated and dispersed within the sirup. The weight of the pulp and entrained liquid remaining in the screen cylinder 4 was about 46 pounds, the balance consisting of sirup and orange products. It was found that 1 cubic centimeter of this sirup-orange juice product had a content of 0.12 mgm. ascorbic acid, several hours after its preparation. In a check test made upon the juice of oranges from the same lot of fruit, the juice being extracted by ordinary hand methods immediately prior to the ascorbic acid determination showed 0.33 milligram of ascorbic acid per cc. As the product prepared as described hereinabove consisted of citrus juice diluted with sirup, it is evident that products made in accordance with this invention have practically the same ascorbic acid content as perfectly fresh orange juice. These determinations were made using the indophenol reduction method, which correctly indicates the vitamin C content of food stuffs. The vitamin C content of products made in accordance with this invention are much higher than those of any canned or preserved dairy or fruit juice known to applicant.

As stated hereinabove, the citrus juices and dispersions may be made in sirups, milk, alcoholic solutions, etc., for use as beverages, food bases, sherbets, ices and the like. It appears that the vitamin C content of products produced in this manner is maintained extremely high over protracted periods of time whereas ordinary citrus juices rapidly degrade in vitamin C content upon standing.

Although a particular form of apparatus has been described, it is to be understood that this is simply illustrative of one form which may be used in carrying out the method of this invention. It will be obvious to those skilled in the art that numerous changes and modifications could be made, the present invention being primarily directed toward a method whereby the novel products described may be produced. All such changes, modifications, adaptations and uses coming within the scope of the appended claims are embraced thereby.

I claim:

1. As a food and beverage base, a citrus fruit product containing juice from the internal sacs of citrus fruit, natural oils from the peel or skin of said fruit, and finely divided fruit solids including portions of the peel of said fruit, said natural oils being in substantially stable dispersion, the major portion of said oils being in the form of droplets not exceeding 0.001 inch in diameter.

2. As a food and beverage base, a citrus fruit product containing juice from the internal sacs of citrus fruit, natural oils from the peel or skin of said fruit, and finely divided fruit solids including portions of the peel of said fruit, said natural oils being in substantially stable dispersion, the major portion of said oils being in the form of droplets having an average diameter of less than about 0.0005 inch.

3. A citrus fruit product capable of being stored with no appreciable deterioration in taste, aroma and color and without separation of solids and oils into distinct layers, comprising milk containing juice from the internal sacs of citrus fruit, natural oils from the skin or peel of said fruit, and finely divided fruit solids, said natural oils being present in substantially the same proportion to the juice as in whole fresh fruit, said natural oils being in substantially stable dispersion in the milk in droplets not exceeding 0.001 inch in diameter.

4. A citrus fruit product capable of being stored with no appreciable deterioration in taste, aroma and color and without separation of solids and oils into distinct layers, comprising milk, containing juice from the internal sacs of citrus fruit, natural oils from the skin or peel of said fruit and finely divided fruit solids, said natural oils being present in substantially the same proportion to the juice as in whole fresh fruit, said natural oils being in substantially stabled dispersion in the milk in droplets having an average diameter of less than about 0.0005 inch.

5. A method of treating whole citrus fruit which comprises rapidly shredding whole citrus fruit by successive cuts along transverse planes so as to cut a thin section of the peel at substantially the same time that a portion of the juice sacs are disrupted, the peel oils from the peel being thus liberated in an atomized condition and carried to the juice liberated from the juice sacs whereby said atomized oil is immediately distributed in said juice in finely dispersed condition.

6. The method of forming a food and beverage base which comprises rapidly shredding whole citrus fruit by cutting thin slices through the peel, albedo and juice sacs simultaneously without compressing the same, to liberate the peel oil in an atomized condition in the presence of the liberated juice whereby the atomized oil is finely dispersed in said juice and then washing said shredded fruit with a sirup to cause said juice with its finely dispersed oil to be dispersed throughout the sirup, the sirup then constituting the food and beverage base.

7. A method of treating whole citrus fruit, which comprises rapidly shredding whole citrus fruit including peel, albedo and juice sacs, along transverse planes so as to shred a portion of the peel at substantially the same time that a portion of the juice sacs of the same fruit are disrupted, whereby oils liberated from the peel are retained in a finely dispersed condition within the juice, by contacting whole citrus fruit with a shredding surface moving at a speed of more than 1500 feet per minute.

8. A method of treating whole citrus fruit, which comprises rapidly shredding whole citrus fruit including peel, albedo and juice sacs, along transverse planes so as to shred a portion of the peel at substantially the same time that a portion of the juice sacs of the same fruit are disrupted, whereby oils liberated from the peel are retained in a finely dispersed condition within the juice, by contacting whole citrus fruit with a shredding surface moving at a linear speed of between 1500 and 3000 feet per minute.

9. A method of treating whole citrus fruit, which comprises rapidly shredding whole citrus fruit including peel, albedo and juice sacs, along transverse planes so as to cut a thin section of the peel at substantially the same time that a portion of the juice sacs of the same fruit are disrupted, the oils being liberated from the peel in a finely dispersed condition in the presence of the liberated juice, and then immediately agitating said juice, dispersed oil and shredded solids with a sirup and screening said mixture with accompanying agitation to remove larger pieces of peel, membrane and albido while permitting the finer solids, juice and oil to be discharged.

WALLACE CURTIS HILL.